United States Patent
Schinkel

(10) Patent No.: US 12,349,692 B2
(45) Date of Patent: Jul. 8, 2025

(54) SYSTEM FOR REMOVING WATER FROM HUMAN BREAST MILK

(71) Applicant: Mother's Milk is Best, Inc., Fort Collins, CO (US)

(72) Inventor: Elizabeth Rinaldi Schinkel, Fort Collins, CO (US)

(73) Assignee: Mother's Milk is Best, Inc., Fort Collins, CO (US)

( * ) Notice: Subject to any disclaimer, the term of this patent is extended or adjusted under 35 U.S.C. 154(b) by 818 days.

(21) Appl. No.: 17/536,274

(22) Filed: Nov. 29, 2021

(65) Prior Publication Data

US 2022/0079179 A1   Mar. 17, 2022

Related U.S. Application Data

(62) Division of application No. 14/589,945, filed on Jan. 5, 2015, now abandoned.

(Continued)

(51) Int. Cl.
*B01D 61/00* (2006.01)
*A23C 9/14* (2006.01)
*A23C 9/20* (2006.01)

(52) U.S. Cl.
CPC .............. *A23C 9/206* (2013.01); *A23C 9/14* (2013.01); *A23C 2210/20* (2013.01); *B01D 61/002* (2013.01)

(58) Field of Classification Search
CPC ....... C02F 1/445; B01D 61/002; B01D 63/08; B01D 63/089; A23C 9/206; A23C 9/14; A23C 2210/20
See application file for complete search history.

(56) References Cited

U.S. PATENT DOCUMENTS 2,116,920 A    5/1938  Wickenden
3,696,931 A *  10/1972 Hough .............. C02F 1/445
                                              206/217

(Continued)

FOREIGN PATENT DOCUMENTS

CH     704073         5/2012
CH     704073 A2 *    5/2012  ............ A23C 1/00

(Continued)

OTHER PUBLICATIONS

ABM Clinical Protocol #8: Human Milk Storage Information for Home Use for Full-Term Infants (Original Protocol Mar. 2004; Revision #Mar. 1, 2010), Breastfeeding Medicine, 2010, vol. 5, No. 3. pp. 127-130.

(Continued)

*Primary Examiner* — Tiffany T Tran
(74) *Attorney, Agent, or Firm* — MacMillan, Sobanski & Todd, LLC

(57) ABSTRACT

Concentrating nutrients in breast milk may be achieved using an apparatus comprising a first sheet of material comprising a forward osmotic membrane, a second sheet of material sealed to the first sheet of material about a common outer perimeter thereof, the first sheet of material arranged so that water can traverse the forward osmotic membrane to an interior of the first and second sheets, and a dry carbohydrate within the interior of the first and second sheets exhibiting an osmotic draw property to draw water from un-concentrated, expressed human milk to form concentrated human milk. After a predetermined time, or upon the milk remaining after drawing of water through the membrane being a desired amount, the water draw can end.

12 Claims, 3 Drawing Sheets

Related U.S. Application Data

(60) Provisional application No. 62/050,898, filed on Sep. 16, 2014, provisional application No. 61/923,542, filed on Jan. 3, 2014.

(56) References Cited

U.S. PATENT DOCUMENTS

| | | | |
|---|---|---|---|
| 4,879,030 A * | 11/1989 | Stache | C02F 1/002 426/115 |
| 5,281,430 A | 1/1994 | Herron et al. | |
| 6,089,389 A | 7/2000 | Sharon et al. | |
| 6,478,147 B1 | 11/2002 | Brander et al. | |
| 7,560,029 B2 | 7/2009 | McGinnis | |
| 7,857,978 B2 | 12/2010 | Jensen et al. | |
| 7,955,506 B2 | 6/2011 | Bryan et al. | |
| 8,029,671 B2 | 10/2011 | Cath et al. | |
| 8,354,025 B2 | 1/2013 | Herron et al. | |
| 8,636,158 B2 | 1/2014 | Frisch | |
| 12,152,058 B2 | 11/2024 | Yudina | |
| 2003/0183575 A1 | 10/2003 | Zeiher et al. | |
| 2004/0004037 A1* | 1/2004 | Herron | B01D 63/026 210/257.2 |
| 2006/0237366 A1 | 10/2006 | Al-Mayahi | |
| 2007/0005006 A1 | 1/2007 | Rosenfeld | |
| 2007/0010760 A1 | 1/2007 | Rosenfeld | |
| 2007/0084819 A1* | 4/2007 | Fialkowski | A61J 9/00 215/11.1 |
| 2008/0187619 A1 | 8/2008 | Hartmann et al. | |
| 2008/0311279 A1 | 12/2008 | Kortum et al. | |
| 2009/0120874 A1 | 5/2009 | Jensen et al. | |
| 2010/0072159 A1 | 3/2010 | Yang | |
| 2010/0206094 A1 | 8/2010 | Shenderov | |
| 2011/0311692 A1* | 12/2011 | Shepard | A23L 7/135 426/389 |
| 2012/0080378 A1 | 4/2012 | Revanur et al. | |
| 2015/0208681 A1 | 7/2015 | Schinkel | |

FOREIGN PATENT DOCUMENTS

| | | | | |
|---|---|---|---|---|
| CN | 1642626 A | 7/2005 | | |
| CN | 101014253 | 8/2007 | | |
| CN | 101939085 | 1/2011 | | |
| CN | 102245283 | 11/2011 | | |
| CN | 102596376 | 7/2012 | | |
| CN | 103140278 | 6/2013 | | |
| CN | 109692571 A | 4/2019 | | |
| EP | 3089770 B1 | 2/2021 | | |
| GB | 2429451 | 2/2007 | | |
| JP | H07-203931 | 8/1995 | | |
| RU | 2008 119 299 | 11/2009 | | |
| RU | 2745815 C1 | 4/2021 | | |
| TW | I 764455 B | 5/2022 | | |
| WO | WO 03/067996 | 8/2003 | | |
| WO | WO-03067996 A1 * | 8/2003 | | A23B 7/02 |
| WO | WO 2006/026878 | 3/2006 | | |
| WO | WO 2010/065625 | 6/2010 | | |
| WO | WO 2010/065652 | 6/2010 | | |
| WO | WO 2011/154946 | 12/2011 | | |
| WO | WO-2011154946 A1 * | 12/2011 | | B01D 61/002 |
| WO | WO 2012/047282 | 4/2012 | | |
| WO | 2013156598 A1 | 10/2013 | | |
| WO | 2015103561 A1 | 7/2015 | | |
| WO | 2020155325 A1 | 8/2020 | | |

OTHER PUBLICATIONS

Berry, D., Fortification driving innovation in dairy, Food Business News, 2018.

Coulter, S. T. et al., Enrichment and Fortification of Dairy Products and Margarine, J. Agr. Food Chem., 1968, vol. 16, No. 2, pp. 158-162.

Heiman, H. et al., Benefits of maternal and donor human milk for premature infants, Early Human Development, 2006, vol. 82, pp. 781-787.

Hydration Technology Innovations, HTI Introduces Vinopack to be Distributed by VA Filtration, Sep. 23, 2011, Albany, Ore./Scottsdale, Ariz.

I.A. Evdokimov et al., "Obrabotka Molochnogo Cyrya Membrannymi Metodami," Zhurnal "Molochnaya Promyshlennost," No. 2, 2012, pp. 34-37.

Nutrition Claims for Dairy Products, Dairy Research Institute, 2011.

O. V. Mosin "Obratno-osmaticheskie filtry na osnove trekovoi membrany," Aug. 2, 2012, pp. 1-10.

Quick, J. A. et al., The Fortification of Foods: A Review, U.S. Department of Agriculture, 1982.

International Search Report and Written Opinion in corresponding International application No. PCT/US2015/010194 dated May 28, 2015.

Canadian Examination Report, Application No. 2935727, dated Mar. 9, 2021.

* cited by examiner

SYSTEM FOR REMOVING WATER FROM HUMAN BREAST MILK

REFERENCE TO PENDING PRIOR PATENT APPLICATIONS

This patent application is a division of prior U.S. patent application Ser. No. 14/589,945, filed Jan. 5, 2015 by Elizabeth Rinaldi Schinkel for METHOD AND APPARATUS FOR FORTIFYING BREAST MILK, which patent application in turn:
(1) claims benefit of prior U.S. Provisional Patent Application Ser. No. 61/923,542, filed Jan. 3, 2014 by Elizabeth R. Schinkel for MMIB SYSTEM; and
(2) claims benefit of prior U.S. Provisional Patent Application Ser. No. 62/050,898, filed Sep. 16, 2014 by Elizabeth Rinaldi Schinkel for METHOD AND APPARATUS FOR CONCENTRATING BREAST MILK.

The three (3) above-identified patent applications are hereby incorporated herein by reference.

TECHNICAL FIELD

This disclosure relates in general to fortifying breast milk, such as by concentrating nutrients within breast milk, in particular for premature babies.

BACKGROUND

Premature babies often require supplements to add nutrients to expressed human breast milk. Available supplements contain cow's milk protein and/or soy. One human milk fortifier available is made with pooled human milk that is sterilized, destroying some of the nutrients found in fresh expressed human milk. These supplements are the first foreign substances introduced to a baby's gut. The risk of intolerance of traditionally fortified feedings is most notable for the potential development of necrotizing enterocolitis, which can lead to gut damage and even death.

SUMMARY

The teachings herein allow for fortification (e.g., through concentration) of a mother's own milk for her premature or sick baby to the prescribed nutrient density required for continued growth and development. Bedside use is possible, and the addition of foreign nutrients and heat processing may be avoided. The concentration of immunoglobulin and other unique nutrients that are provided in a mother's milk for her own baby is possible without external pressure and via forward osmosis to protect the fragile nutrients in the breast milk that can be damaged even by shaking the liquid too forcefully. The use of a forward osmotic membrane without nitrates allows for conservation of the immunoglobulin on the nutrient concentration side of the membrane and only water passes via forward osmosis to the other side of the membrane. The process is time sensitive for nutrient concentration and the higher concentration of nutrients on the waste side allows for the osmotic draw of water.

According to the teachings herein, one method described herein includes placing, into contact with a quantity of un-concentrated, expressed human milk, a forward osmotic membrane separating a material exhibiting an osmotic draw property from the quantity of un-concentrated, expressed human milk to draw water from the quantity of un-concentrated, expressed human milk to form concentrated human milk, and withdrawing the forward osmotic membrane from contact with the concentrated human milk when the concentrated human milk reaches a desired nutrient level.

An apparatus described herein includes a first sheet of material comprising a forward osmotic membrane, a second sheet of material sealed to the first sheet of material about a common outer perimeter thereof, the first sheet of material arranged so that water can traverse the forward osmotic membrane to an interior of the first and second sheets, and a dry carbohydrate within the interior of the first and second sheets exhibiting an osmotic draw property to draw water from un-concentrated, expressed human milk to form concentrated human milk.

Variations in these and other embodiments of the invention are described hereinafter.

DETAILED DESCRIPTION

Figure 1A:
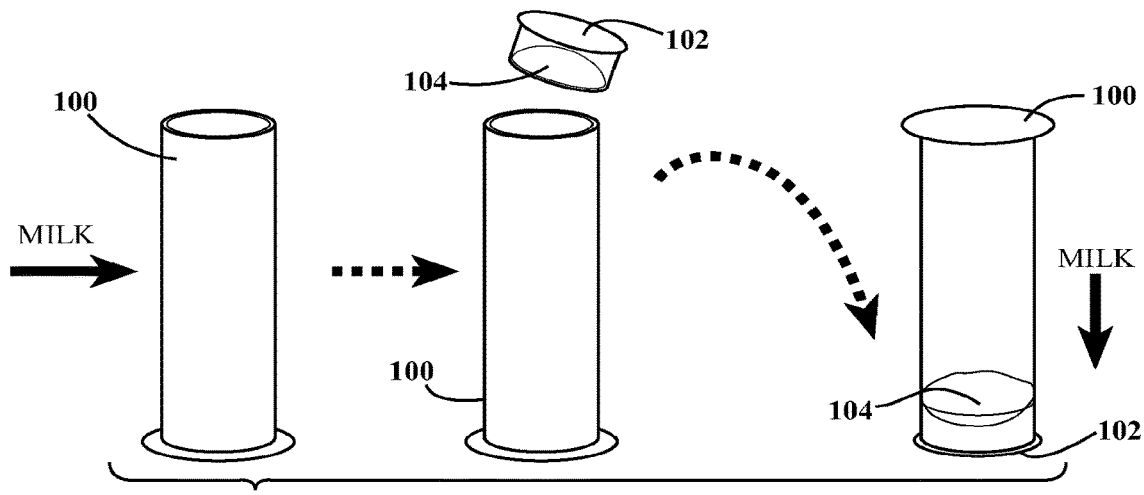
FIG. 1A is a side view showing a sequence of operations using one example of an apparatus incorporating the teachings herein.
Figure 1B:
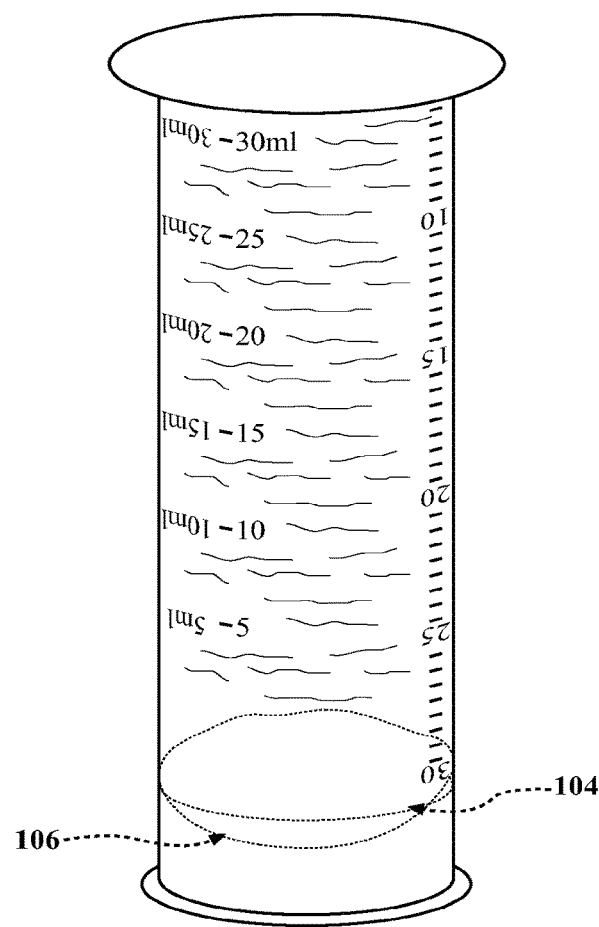
FIG. 1B is a close-up view showing the apparatus of FIG. 1A with measurement indicia.

One example of an apparatus incorporating the teachings herein is shown in FIGS. 1A and 1B. In this apparatus, a bottle 100, which may be a conventional bottle used for holding expressed breast milk, is first filled with un-concentrated, expressed breast milk. A screw-on receptacle 102 is shown that includes a forward osmotic membrane 104 across a ring below the threads used to screw receptacle 102 to bottle 100. Other shapes and materials may be used for bottle 100, and techniques other than screwing may be used to attach bottle 100 and receptacle 102 as long as a seal is formed that prevents fluid leaks of fluid from inside of bottle 100 to outside of bottle 100. A sealing ring or other sealing component made of an elastomeric polymer may be used, for example, to form a fluid-tight seal between bottle 100 and receptacle 102. Bottle 100 and receptacle 102 are both desirably food-safe fluid containers.

Forward osmotic membrane 104 may form a pouch 106 within receptacle 102 that is filled with a draw material such as a dry carbohydrate or mix of dry carbohydrates that will draw (e.g., pure) water from the milk and hold that water within the contours of pouch 106 and forward osmotic membrane 104. In one implementation, forward osmotic membrane 104 uses sucrose as the draw material. A filler material may be used to support the draw material and such material is not critical as long as it is inert to the expressed breast milk and designated as safe for contact with food. In one desirable implementation, pouch 106 is expandable as water is pulled across forward osmotic membrane 104 and into the draw material. In this implementation, forward osmotic membrane 104 forms pouch 106 with a second sheet of expandable material sealed with forward osmotic membrane 104. In other implementations, pouch 106 is not expandable. That is, forward osmotic membrane 104 forms pouch with a second sheet of non-expandable material sealed with forward osmotic membrane 104 such that pouch 106 is sized for the amount of water it is expected to hold.

In either case, the second sheet is formed of a material that is designated as safe for contact with food. Further details of the forward osmotic membrane and another embodiment of a pouch formed therewith are discussed in detail with respect to FIGS. 2-4 below.

Referring again to FIGS. 1A and 1B, once receptacle 102 is affixed to bottle 100, bottle 100 may be turned upside down such that the milk is on one side of forward osmotic membrane 104. In this way, the draw material supported within pouch 106 will draw water with low pressure or no external pressure (other than gravity). In this implementation, receptacle 102 may be space limited to prevent over-concentration of the human milk.

The apparatus may be used to concentrate expressed human milk from 20 kilocalories (kcal) per ounce to 24 kcal per ounce. Bottle 100 may be filled with up to 30 milliliters (ml) of milk and inverted. Pouch 106 of forward osmotic membrane 104 expands to fill receptacle 102. Once water is drawn into the pouch 106 sufficient to fill receptacle 102, the remaining breast milk has the desired concentrated level of nutrients. In another implementation, the filtering may be timed as discussed below. Bottle 100 can then be inverted such that receptacle 102 may be unscrewed and discarded as waste. Alternatively, pouch 106 may be discarded such that receptacle 102 is reusable with a new pouch 106 attached thereto. A nipple may then be screwed on to the threads of bottle 100 to feed an infant. The resulting liquid may also be moved to another delivery device for ingestion by an infant or other individual needing the nourishment.

In another implementation, forward osmotic membrane 104 is fitted across and secured to receptacle 102 by any number of techniques to seal draw material within receptacle 102. In this implementation, forward osmotic membrane 104 does not have an opposing second sheet forming pouch 106. The filtering may occur until the level of liquid within receptacle 102 that was drawn into the draw material reaches a level expected to produce a desired concentration of nutrients in the milk remaining within bottle 100, or until a time limit expires.

Measurement of the breast milk and the draw material may provide an exact measure of the concentration of nutrients after removal of the water.

There is potential for adaptation of this system to use in larger operations such as breast milk banks for both babies and human milk used for therapeutic feeding such as with intestinal transplant and other immunocompromised patients.

Bottle 100 and receptacle 102 may be varied in size and shape to allow use of different sizes as needed to concentrate different amounts of milk.

The forward osmosis process of concentrating expressed human milk described herein may be used with a single use/disposable forward osmotic membrane or with reusable forward osmotic membranes depending on if there is a single user and if the receptacle for the draw material/carbohydrate is replaceable and sanitation is feasible.

In yet another implementation, and regardless of whether pouch 106 is formed of an expanding material or non-expanding material with forward osmotic membrane 104, forward osmotic membrane 104 may be formed in the shape of a teabag and dropped into a container of un-concentrated, expressed milk. That is, forward osmotic membrane 104 is not attached for use with receptacle 102. It could be, for example, in the shape of a teabag. Once forward osmotic membrane 104 has removed the desired amount of water, it may be removed from the more concentrated breast milk. This implementation is described in more detail with respect to FIGS. 2-4.

Figure 2:
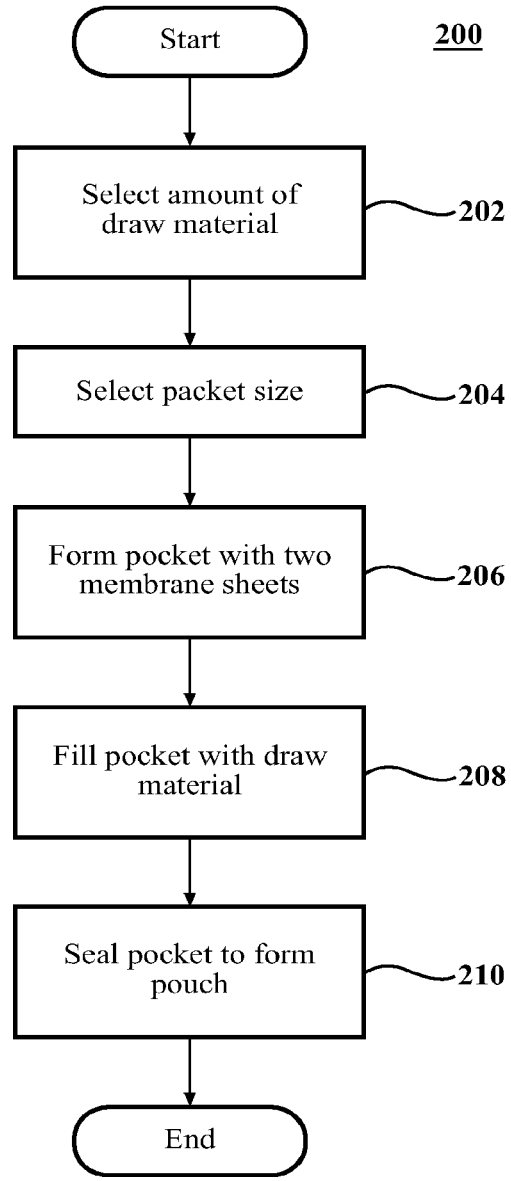
FIG. 2 is a flowchart of a process of manufacturing a pouch according to the teachings herein.

One embodiment of a pouch that may be used with either the apparatus of FIG. 1 or as a separate teabag implementation is manufactured as described with respect to a process 200 of FIG. 2. At step 202, the amount of draw material is selected based on the amount of water to be drawn from the expressed milk. The amount may also be selected based on a desired time for the filtering and the size of the forward osmotic membrane. For example, the same amount of draw material would draw water faster when used with a forward osmotic membrane having a larger surface size than one having a smaller surface size. As mentioned, the draw material used for drawing the water across the forward osmotic membrane may be a dry carbohydrate. Sucrose is desirable, but other dry carbohydrates such as dextrose or lactose may be used. Mixtures of various dry carbohydrates may be used. The form of the dry carbohydrate may be, for example, a fine powder or pellets. The one or more dry carbohydrates may be mixed with a filler material as described above to, for example, increase the shelf life of the finished product. In one implementation, the dry carbohydrate is a food-grade, superfine powder.

At step 204, the storage packet size is selected. The size may be selected in conjunction with the selection of the amount of draw material in step 202 and may be dictated by the application, such as the size of the container in which the milk will be processed. This would be bottle 100 in one example.

Figure 3:
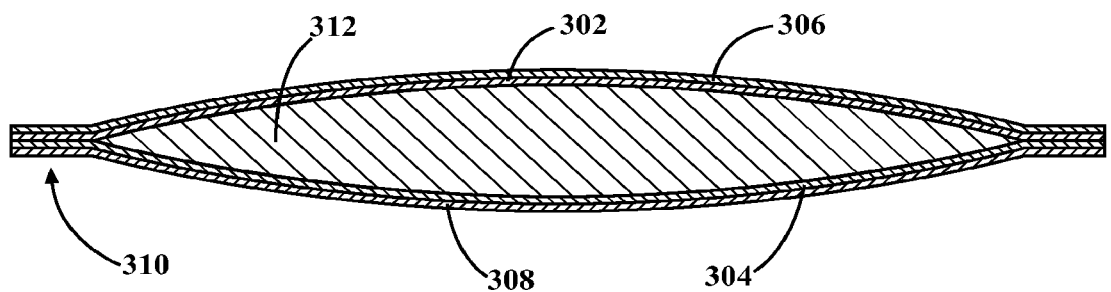
FIG. 3 is a cross-section of one example of a pouch according to the teachings herein.

In the embodiment described above, pouch 106 is formed of a single forward osmotic membrane 104. At steps 206 to 210, a pouch 300 such as that shown in FIG. 3 is formed. At step 206, a pocket is formed with two sheets 302, 304 of a forward osmotic membrane. Membrane sheets 302, 304 are arranged back-to-back such that the osmotic draw is to the interior of membrane sheets 302, 304. Membrane sheets 302, 304 may be sealed about most of the edge surface using a press or other known techniques-either with or without the application of heat. One example of sealing about most of the edge surface when membrane sheets 302, 304 are rectangular involves sealing about three of the four edges. Optionally, membrane sheets 302, 304 may be sealed with similarly-sized sheets 306, 308 of a laminate film to form a seal 310 about a portion of the outer perimeter. Membrane sheets 302, 304 may be formed of a plurality of materials such as a polyethylene or polyester substrate with cellulose and a drying agent, such as glycerine. At least the outside-facing surfaces of membrane sheets 302, 304 should be approved for contact with food. The glycerine serves to seal micropores in the substrate to protect them from being sealed by the draw material.

Possible forward osmotic membranes are available from Hydration Technology Innovations, LLC of Albany, OR, within the OsMem FO family of membrane products. The laminate film is optional and may be used for protection in shipping or for structural support, etc. Where a laminate film is desired or required, it may be formed of a number of materials both safe for use with food products and permeable to liquid. Alternatively, the laminate film may be impermeable to liquid and removed before use of pouch 300. In one embodiment, laminate sheets 306, 308 may be a laminate comprising, for example, a high-density polyethylene (HDPE), low-density polyethylene (LDPE) or medium-density polyethylene (MDPE) resin or ethylene polymers approved for use in the manufacture of articles intended for contact with food.

After forming the pocket in step 206, process 200 advances to step 208. The opening of the pocket formed by sheets 302-308 is filled with draw material 312 at step 208. Examples of draw material 312 are described above. Once the pocket is filled with draw material 312, it is sealed to form the pouch 300. Optionally, pouch 300 is sealed within a thermoplastic resin for transportation and storage.

In the embodiment described above, pouch 106 is formed of a single forward osmotic membrane 104, and pouch 300 is formed of two sheets of forward osmotic membrane 104. Pouch 300 may, however, be formed of a single forward osmotic membrane 104 folded over itself so as to form the opening for draw material 312.

Figure 4:
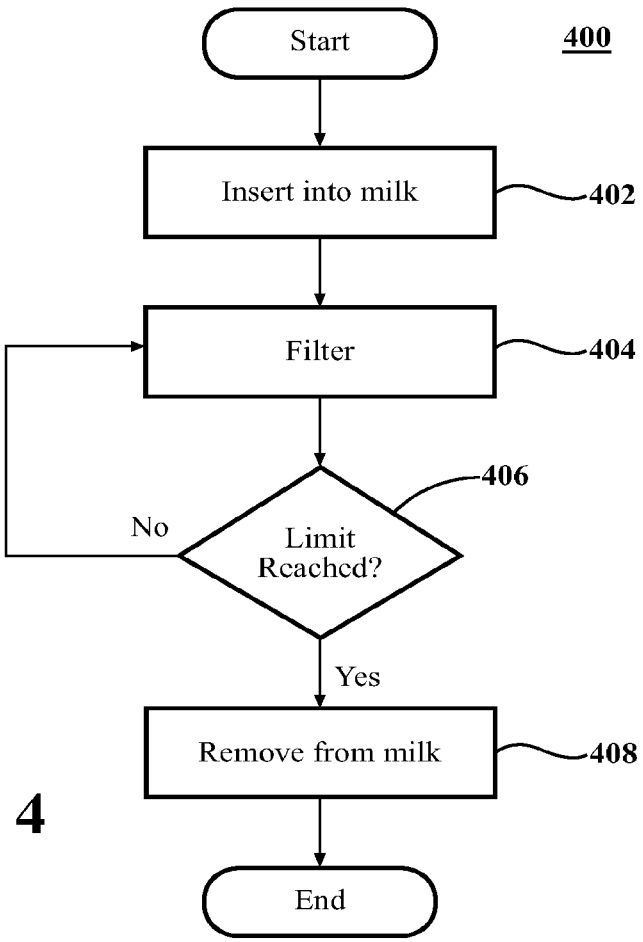
FIG. 4 is a flowchart of a process of using a pouch according to FIG. 3.

A process 400 of using pouch 300 is described with respect to FIG. 4. At step 402, pouch 300 is inserted into the un-concentrated, expressed breast milk. Pouch 300 filters water out of the milk by drawing the water through the forward osmotic membranes 302, 304 into draw material 312 at step 404. Filtering ends when a limit is reached at step 406. The limit at step 406 can be a time limit developed based on experimentation. For example, the limit can be selected based on the amount of milk and the size of pouch 300 that would result in the desired concentration in the final filtered milk product.

Once the limit is reached at step 406, process 400 advances to step 408 where pouch 300 is removed from the now concentrated milk. Process 400 then ends.

Experimental results show the usefulness and efficacy of the teachings herein.

In a study to test the timing of the water draw, a 3 in×3 in forward osmosis pouch formed with two sheets of a forward osmotic membrane and filled with 10 g of sucrose as described with respect to FIGS. 2 and 3 was placed into 90 ml of whole cow's milk. The milk was stored in a seal container for two hours at room temperature, after which the pouch was removed. The remaining milk was measured and demonstrated that 12 ml of water was removed from the milk. In another study, a 3 in×3 in forward osmosis pouch formed with two sheets and filled with 10 g of sucrose as described with respect to FIGS. 2 and 3 was placed into 60 ml of whole cow's milk. After two hours at room temperature in a sealed container, the pouch was removed. The remaining milk was measured and demonstrated that water in the amount of 14 ml was removed. From this information, it was determined that a desired embodiment would include a larger amount of draw material.

Next, human milk sample studies were performed. In one test, two 3.5 in×3.5 in forward osmosis pouches were used. Each was formed with two sheets of the same forward osmotic membrane used in the cow's milk test, and each was filled with 20 g of sucrose. The pouches were rinsed in hot water for 15 min before use to remove the glycerine, although this step is not necessary. Each pouch initially weighed 22 gm, which weight increased by 10 gm at the end of the rinse. The increase weight per pouch was due to the draw of water across the forward osmotic membranes and into the pouch during the rinse.

Two pouches were added to 235 ml of expressed human milk. They were soaked for 3.25 hours in the milk stored in a refrigerator at 34 degrees Fahrenheit in a covered container. After the soak, the two pouches were removed and weighed. The milk remaining in the sample demonstrated low water removal—the amount of water removed was insufficient to achieve the desired nutrient levels in the concentrated milk. Due to this low water removal, a third 3.5 in×3.5 in forward osmosis pouch, also formed with two sheets of the same forward osmotic membrane and filled with 20 g of sucrose as described with respect to FIGS. 2 and 3, was subjected to the optional hot water rinse for 15 min. The third pouch experienced the same weight increase as the first two. After rinsing, the pouch was placed within the remaining milk (that is, the now partially-concentrated human milk). The milk, with the pouch, was placed in the refrigerator and soaked for 2.0 hours at 34° F. in a covered container.

The third pouch was removed at the end of the soak after removing the milk from the refrigerator. The total water removed by all three pouches was 29 ml. Fluid lost in processing was 10 ml. After processing, concentrated (processed) milk in the amount of 196 ml was analyzed for nutrient and glycerine content. A 120 ml control sample of un-concentrated (unprocessed), expressed human milk to which no filtering was applied was analyzed for nutrient content.

Results of the comparison are produced below as Table 1.

| | | | |
|---|---|---|---|
| Ash | 0.18 | 0.23 | g/100 g |
| Total Calories (calculated) | 57 | 66 (for 98 ml) | kcal |
| Chloride | 50 | 50 | mg/100 g |
| Dietary Fiber | <0.5 | <0.5 | mg/100 g |
| Moisture (Air Oven) | 88.84 | 86.55 | g/100 g |
| Protein | 1.06 | 1.29 | g/100 g |
| Saturated Fat | 0.82 | 0.86 | g/100 g |
| Sugars | 5.5 | 7.0 | g/100 g |
| Vitamin A | 590 | 540 | I.U./100 |
| Calcium | 2.9 | 3.9 | mg/100 g |
| Carbohydrates (calculated) | 7 | 9 | g/100 g |
| Cholesterol | 9 | 10 | mg/100 g |
| Iron | <0.15 | <0.15 | mg/100 g |
| Phosphorus | 90 | 10 | mg/100 g |
| Modified Reese Gottlieb Ether Extraction Method (Fat Standard measure) | 2.55 | 2.62 | g/100 g |
| Sodium | 26 | 29 | mg/100 g |
| Trans Fat | 0.02 | 0.02 | g/100 g |
| Vitamin C | <0.1 | <0.1 | mg/100 g |

Ash, Chloride, Dietary Fiber, Moisture, Protein, Saturated Fat, Cholesterol, Phosphorus, Trans Fat and Vitamin C were all measured according to the applicable Official Methods of Analysis of AOAC INTERNATIONAL (OMA). Vitamin A, Iron and Sodium were measured according to known testing (e.g., WRE) methods. Sugars were measured according to a method compliant with both OMA and WRE. Calcium was measured according to the Environmental Protection Agency (EPA) 6020 method.

As can be seen from the test results, desirable increases in Calories (caloric content), Protein, Saturated Fat, Sugars, Calcium, Sodium and Carbohydrates resulted, with little change in other content characteristics except for Phosphorus. It is believed that the reduction in Phosphorus is an error. Glycerin content was negligible, and this result is not expected to change even when the optional rinsing step does not occur.

From the studies, it was noted that the lower temperature used during the soaking/filtering step for the human milk samples as compared to that used for the cow's milk samples notably slowed the water draw from the samples. An increased amount of draw material and/or a higher temperature during the soaking/filtering step would promote faster milk concentration by forward osmosis. Increase in the surface area and/or overall size of the pouch beyond what is needed to enclose the draw material is expected to have a negligible effect on the process and results, if any.

As mentioned, the temperatures used in the testing herein were room temperature (up to 77° F. or 25° C.) and 37° F.

Higher temperatures are possible to speed up the process, but there may result in a corresponding reduction in the storage life of the milk. For example, room temperature storage of breast milk is not recommended for more than 6-8 hours. (See Academy of Breastfeeding Medicine, "Clinical Protocol Number #8: Human Milk Storage Information for Home Use for Healthy Full Term Infants," 2004 (Princeton, NJ)). Refrigerator temperatures are often up to 39° F. or 4° C., and storage of five days is possible. An insulated cooler bag can keep the milk fresh for 24 hours at temperatures of up to 39° F. Milk stored for longer durations at the temperatures described is safe, but some of the lipids Even an increase in the temperature of the milk from 37° F. to 39° F. is expected to increase the speed of the soaking/filtering step. If the soaking/filtering step is done at room temperature, immediate use may be desirable.

While the invention has been described with certain embodiments, the scope of the invention is not so limited. The skilled artisan, provided with the teachings herein, would understand modifications and variations that fall within the scope of the appended claims.

What is claimed is:

1. A system for removing water from expressed human breast milk so as to concentrate the expressed human breast milk for feeding to an infant, the system comprising:
    a container having an interior volume for holding a quantity of the expressed human breast milk, wherein the container is a hand-held container; and a forward osmotic membrane assembly, the forward osmotic membrane assembly comprising:
    a first forward osmotic membrane directly joined to a second forward osmotic membrane to form a pouch defining a sealed interior, wherein at least a portion of the first or second forward osmotic membrane-being configured to pass the water therethrough;
    a draw material disposed within the sealed interior of the pouch; and
    the first forward osmotic membrane and the second forward osmotic membrane are arranged back-to-back around the draw material, whereby the draw material is configured to draw the water into the sealed interior of the pouch defined by the first forward osmotic membrane and the second forward osmotic membrane;
    wherein the container and the forward osmotic membrane assembly are together configured so that the forward osmotic membrane assembly is sequentially:
    brought into direct contact with the expressed human breast milk contained within the interior volume of the container so that the forward osmotic membrane assembly exhibits an osmotic draw property on the water in the expressed human breast milk, whereby to concentrate the expressed human breast milk contained in the interior volume of the container; and
    removed from direct contact with the expressed human breast milk contained within the interior volume of the container.

2. The system of claim 1 wherein the container has measurement indicia.

3. The system of claim 1 wherein the draw material of the forward osmotic membrane assembly comprises a dry carbohydrate material.

4. The system of claim 1, wherein the draw material comprises at least one of: sucrose, dextrose, or lactose.

5. The system of claim 1, wherein the container comprises an opening for insertion of the forward osmotic membrane assembly into the interior volume of the container.

6. The system of claim 1 wherein the forward osmotic membrane assembly draws the water from the expressed human breast milk in an absence of external pressure.

7. The system of claim 1 wherein the forward osmotic membrane assembly draws the water from the expressed human breast milk in an absence of applied heat.

8. A system for removing water from expressed human breast milk so as to concentrate the expressed human breast milk to produce concentrated breast milk for feeding to an infant, the system comprising:
    a container having an interior volume for holding a quantity of the expressed human breast milk, wherein the container is a hand-held container;
    a pouch comprising:
    a first forward osmotic membrane configured to pass the water therethrough;
    a second forward osmotic membrane; and
    a draw material; wherein:
    the first forward osmotic membrane is directly joined to the second forward osmotic membrane;
    the first forward osmotic membrane and the second forward osmotic membrane are arranged back-to-back around the draw material, whereby the draw material is configured to draw the water into the pouch through the first or second forward osmotic membrane; and
    a cap assembly releasably mountable to the container, having a receptacle configured to receive the pouch so that at least a portion of the first or second-forward osmotic membrane is presented to the interior volume of the container, such that when the expressed human breast milk is contained within the interior volume of the container and the cap assembly is mounted to the container, the expressed human breast milk contained within the container directly contacts the portion of the first or second forward osmotic membrane so that the water contained within the expressed human breast milk is drawn into the pouch and the expressed human breast milk contained within the interior volume of the container is concentrated; and
    wherein the cap assembly and the pouch are configured to be removable from the container.

9. The system of claim 8, wherein the draw material comprises a dry carbohydrate material.

10. The system of claim 8, wherein the draw material comprises at least one of: sucrose, dextrose, or lactose.

11. The system of claim 8, wherein the forward osmotic membrane assembly draws the water from the expressed human breast milk in an absence of external pressure.

12. The system of claim 8, wherein the forward osmotic membrane assembly draws the water from the expressed human breast milk in an absence of applied heat.

* * * * *